United States Patent [19]

Hoben

[11] Patent Number: 5,033,582

[45] Date of Patent: Jul. 23, 1991

[54] RETRACTABLE LADDER ASSEMBLY

[75] Inventor: Laurence R. Hoben, Minneapolis, Minn.

[73] Assignee: Caterpillar Inc., Peoria, Ill.

[21] Appl. No.: 569,674

[22] Filed: Aug. 20, 1990

[51] Int. Cl.⁵ ............................................. E06C 5/04
[52] U.S. Cl. ...................................... 182/85; 182/106; 182/127; 280/166
[58] Field of Search ................... 182/83, 85, 106, 127, 182/90; 280/166, 163

[56] References Cited

U.S. PATENT DOCUMENTS

| 415,661 | 11/1889 | White | 182/106 |
|---|---|---|---|
| 719,183 | 1/1903 | Buell | 182/83 |
| 1,178,314 | 4/1916 | Greco | 182/85 |
| 1,808,492 | 6/1931 | Bocchino | 182/85 |
| 3,601,220 | 8/1971 | Saucier | 182/84 |
| 3,869,022 | 3/1975 | Wallk | 182/96 |
| 4,067,412 | 1/1978 | Jackson | 182/85 |
| 4,243,120 | 1/1981 | Pratt, Jr. et al. | 182/98 |

Primary Examiner—Reinaldo P. Machado
Attorney, Agent, or Firm—Calvin E. Glastetter

[57] ABSTRACT

Ladder assemblies are needed on large vehicles for an operator to ascend to the cab of a vehicle. The ladder assembly should be moveable between a lowered position for easy access and a raised position to prevent damage to the ladder when the vehicle is in use. The subject ladder assembly includes a pair of spaced rails mounted to the vehicle and an elongate ladder moveably positioned between the spaced rails. Cooperating means extend between the rails and the elongate ladder to position the ladder with respect to the rails and guide the ladder on the rails when the ladder is moved. The arrangement of components provides a simple and compact arrangement for raising and lowering the ladder.

6 Claims, 3 Drawing Sheets

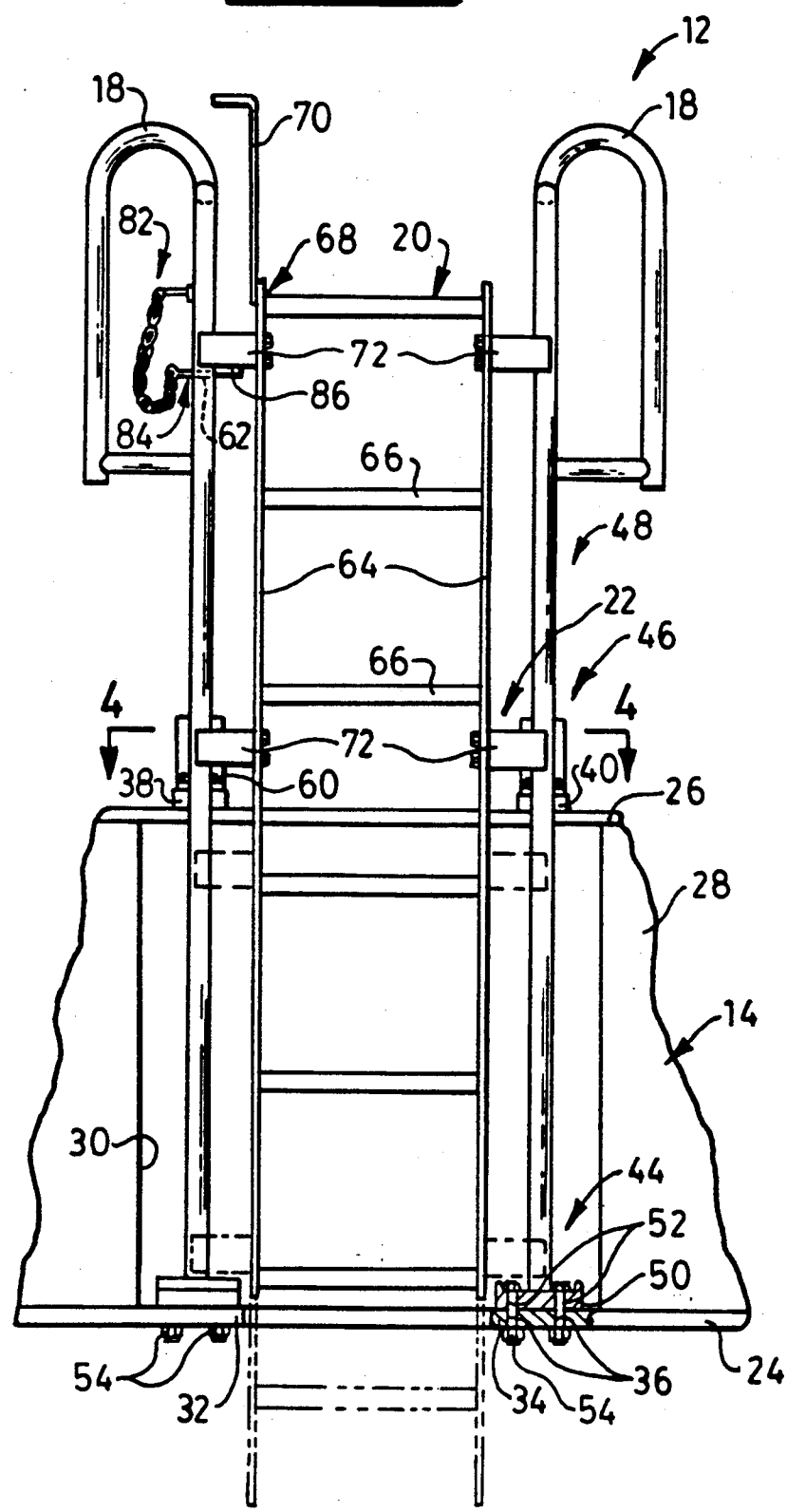

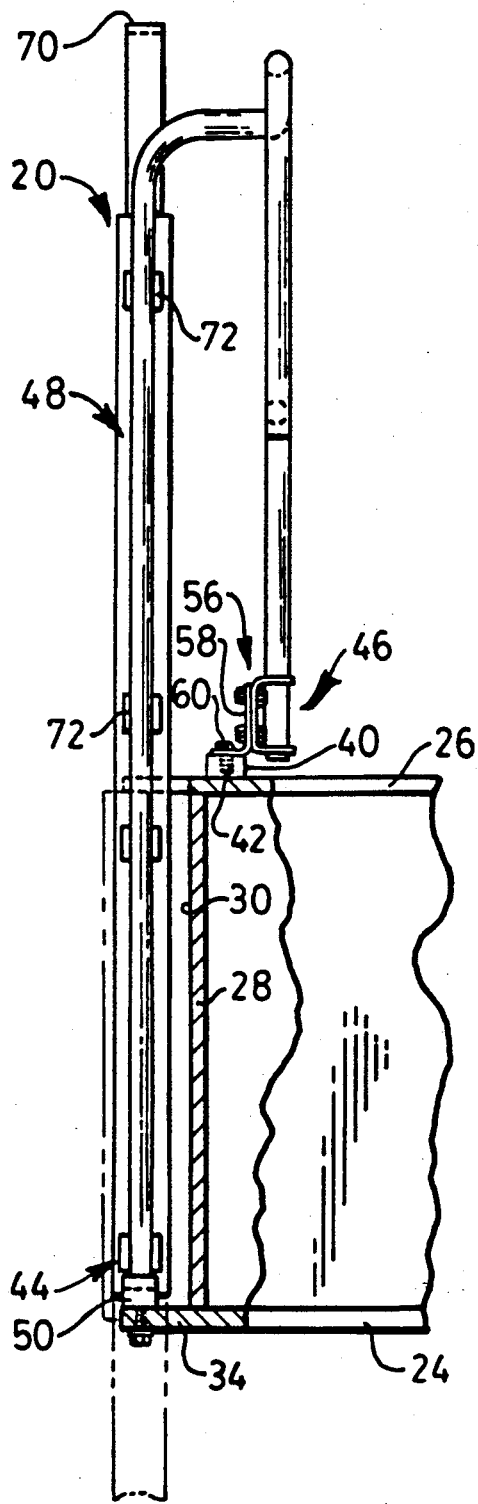

RETRACTABLE LADDER ASSEMBLY

TECHNICAL FIELD

This invention relates to a ladder assembly and more particularly to means for positioning and guiding an elongate ladder with respect to a pair of spaced rails.

BACKGROUND ART

Ladder assemblies are typically needed on large vehicles for an operator to climb up to the cab of the vehicle. The ladder must be moved to a lowered position to allow the operator to climb onto the vehicle and moved to a raised position to prevent damage to the ladder when the vehicle is in use. One example involves a ladder asembly having a ladder and rails which are positioned in a track to guide and position the ladder during movement. In another example, it has been proposed to use link members to move the ladder between a lowered and a raised position. One of the problems associated with an arrangement using tracks or linkage to guide and support the ladder during movement is that the structure is too complex and bulky. The present invention is directed to overcome one or more of the problems as set forth above.

DISCLOSURE OF THE INVENTION

In the present invention, a rectractable ladder assembly includes a pair of rails spaced a predetermined distance apart and being mounted on a frame of a vehicle. An elongate ladder is positioned between the spaced rails. The elongate ladder includes a pair of spaced parallel stringers. A plurality of transversely extending treads are positioned between and connected to the spaced stringers at vertically spaced intervals. A means cooperates with the spaced pair of rails and the stringers to position the elongate ladder with respect to the rails. The means guides the ladder on the pair of rails when the ladder is moved between a lowered position and a raised position.

The present invention provides a simple and compact ladder assembly having spaced rails mounted to the frame of a vehicle. An elongate ladder is positioned between the spaced rails and is guided on the spaced rails when moved between the raised and the lowered positions.

BRIEF DESCRIPTION OF THE DRAWINGS

FIG. 2 is an enlarged rear view of the ladder assembly showing the embodiment of the present invention;

FIG. 3 is a side view of the ladder assembly of FIG. 2; and

BEST MODE FOR CARRYING OUT THE INVENTION

Figure 4:
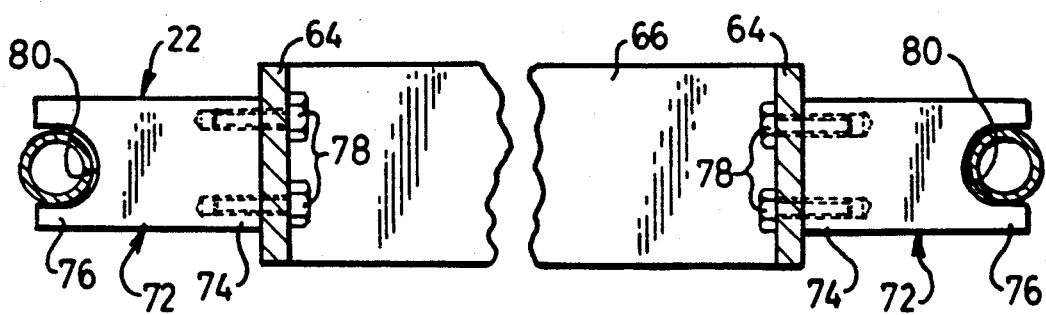
FIG. 4 is a sectional view of the ladder assembly taken generally along the line 4—4 in FIG. 2.
Figure 1:
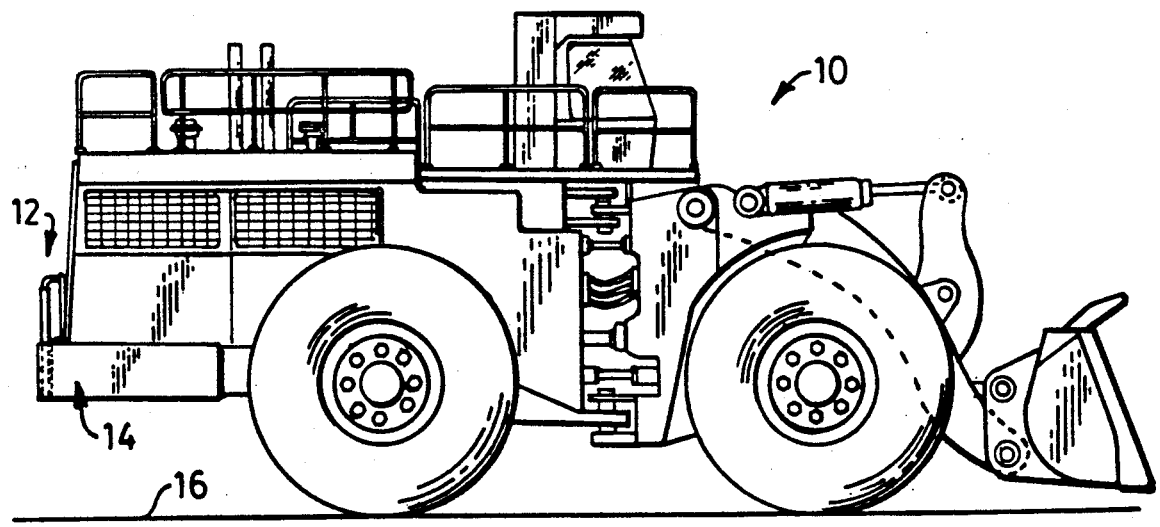
FIG. 1 is a side elevation view of a wheel loader vehicle showing a ladder assembly mounted thereon in its raised position.

Referring to FIG. 1, there is shown generally at 10 a wheel loader vehicle having a ladder assembly 12 mounted on the rear frame 14 thereof and shown in the raised position. The ladder assembly 12 is adapted for allowing an operator to move between the ground surface 16 and the top of the rear frame 14. As best shown in FIGS. 2, 3, and 4, the ladder assembly 12 comprises a pair of tubular spaced rails 18, an elongate ladder 20, and means 22 for cooperating with the spaced rails 18 and the elongate ladder 20.

The rear frame 14 has a bottom plate 24, a top plate 26, a rear plate 28 extending therebetween. A slot 30 is formed in the frame 14 by the shape and cutouts of the plates 24, 26 and 28. The bottom plate 24 has a first mounting portion 32 extending into the slot 30. A second mounting portion 34 is horizontally spaced a predetermined distance from the first mounting portion 32 and also extends into the slot 30. Each of the mounting portions 32,34 includes a pair of mounting holes 36. The top plate 26 includes a first mounting block 38. A second mounting block 40 on the top plate 26 is horizontally spaced a predetermined distance from the first mounting block 38. Each of the mounting blocks 38,40 includes a pair of threaded mounting holes 42. The mounting portions 32,34 are horizontally spaced the same predetermined distance as the mounting blocks 38,40.

Each one of the pair of spaced rails 18 includes a first end portion 44, a second end portion 46, and a central portion 48. The first end portion 44 has a mounting pad 50, seated on the complimentary mounting portion 32,34, which includes a pair of spaced holes 52. The spaced holes 52 align with the mounting holes 36 of the mounting portion 32,34. A pair of bolts 54 positioned in the aligned holes 36,52 fasten the mounting pad 50 to the mounting portion 32,34. The second end portion 46 includes a mounting assembly 56. The mounting assembly 56 includes a mounting plate 58 seated on the complimentary mounting block 38,40 and is attached thereto by a pair of bolts 60 threadably engaged in the threaded mounting holes 42 of the mounting block 38,40. The central portion 48 of one of the spaced rails 18 has a hole 62 therethrough.

The elongate ladder 20 includes a pair of spaced parallel stringers 64 and a plurality of transversely extending treads 66 positioned between and connected to the spaced stringers 68 at vertically spaced intervals. The ladder 20 has an upper end portion 68 which has a handle 70. The elongate ladder 20 is positioned between the spaced pair of rails 18.

The cooperating means 22 includes a plurality of brackets 72 having a first end portion 74 and a second end portion 76. The first end portion 74 is mounted on the stringers 64 by fastening means, such as bolts 78, and extends therefrom toward the rails 18. The second end portion 76 has a slot 80 which slidably registers with the rails 18 to position and guide the ladder 20 with respect to the rails 18.

A latch means 82 is fastened to the one rail 18. The latch means 82 includes a pin 84 having an extending portion 86 adapted to be inserted through the holes 62 in the rail and extend a predetermined distance toward the other rail. The second end portion 76 of one of the brackets 72 is seated on the extending portion 86 of the pin 84 when the ladder is in the raised position.

INDUSTRIAL APPLICABILITY

In the use of the present invention, the elongate ladder 20 is shown in the raised position. When the vehicle operator prepares to climb down from the vehicle 10, the pin 84 must be pulled out to allow the ladder 20 to move. The operator grasps the handle 70 and the ladder 20 moves toward the lowered position as shown in phantom lines in FIG. 2. The brackets 72 will slide on the rails 18 to guide and position the ladder 20 during movement of the ladder from the raised to the lowered position. The downward movement of the ladder will be stopped when the lower brackets 72 contact the mounting pads 50. The lower brackets 72 support the weight of the ladder 20 and the operator. When the operator climbs onto the vehicle, he steps on the treads 66 and uses the rails 18 and treads 66 to climb onto the top plate 26 of the rear frame 14 of the vehicle 10. The operator stands on the top plate 26 of rear frame 14 and grasps the handle 70 and pulls the ladder 20 toward the raised position. With the ladder 20 in the raised position, the pin 84 is inserted through the hole 62 and extends toward the ladder 20. The upper bracket of the plurality of brackets 72 will be seated on the extending portion 86 of the pin 84 to prevent downward movement of the ladder.

In view of the foregoing, it is readily apparent that the structure of the present invention provides a simple and compact ladder assembly for ascending or decending a vehicle. The rails are mounted on the frame of the vehicle. An elongate ladder is moved between the raised and lowered positions using the rails as a guide.

Other aspects, objects and advantages of this invention can be obtained from a study of the drawings, the disclosure and the appended claims.

I claim:

1. A retractable ladder assembly adapted to be mounted on a frame of a vehicle, comprising:
   a pair of rails spaced a prdetermined distance apart and each of the rails including a mounting pad extending between the rail and the frame of the vehicle;
   an elongate ladder movable positioned between the spaced rails, the elongate ladder includes a pair of spaced parallel stringers, and a plurality of transversely extending treads positioned between and connected to the spaced stringers at vertically spaced intervals; and
   means for cooperating with the spaced pair of rails and the stringers to position the ladder with respect to the rails and guide the ladder on the pair of rails when the ladder is moved between a lowered position and a raised position, the cooperating means is mounted on the stringer of the elongate ladder and extends toward the rails and provides a stop which contacts the mounting pads to stop movement of the elongate ladder.

2. The ladder assembly of claim 1 wherein the cooperating means suports the elongate ladder when the elongate ladder is in the lowered position.

3. The ladder assembly of claim 2 wherein the rails are tubular.

4. The ladder assembly of claim 3 wherein the cooperating means includes a plurality of brackets having an end portion having a slot which slidably registers with the tubular rails.

5. The ladder assembly of claim 4 including latch means for maintaining the elongate ladder in the raised position.

6. The ladder assembly of claim 5 wherein the latch means inlcudes a pin extending through one of athe pair of rails and having an extending portion which contacts one of the brackets of the plurality of brackets to prevent downward movement of the elongate ladder.

* * * * *